United States Patent
Zyzdryn et al.

(10) Patent No.: US 9,280,695 B2
(45) Date of Patent: Mar. 8, 2016

(54) APPARATUS AND METHOD FOR DETERMINING SEQUENCING OF FINGERS IN IMAGES TO A TWO-FINGER SCANNER OF FINGERPRINT IMAGES

(75) Inventors: Grzegorz Zyzdryn, Palm Beach Gardens, FL (US); Daniel H. Raguin, Acton, MA (US)

(73) Assignee: CROSS MATCH TECHNOLOGIES, INC., Palm Beach Gardens, FL (US)

( * ) Notice: Subject to any disclaimer, the term of this patent is extended or adjusted under 35 U.S.C. 154(b) by 445 days.

(21) Appl. No.: 12/927,352

(22) Filed: Nov. 12, 2010

(65) Prior Publication Data

US 2011/0157346 A1  Jun. 30, 2011

Related U.S. Application Data

(60) Provisional application No. 61/260,355, filed on Nov. 11, 2009.

(51) Int. Cl.
   *H04N 7/18* (2006.01)
   *G06K 9/00* (2006.01)

(52) U.S. Cl.
   CPC ........ *G06K 9/00046* (2013.01); *G06K 9/00067* (2013.01)

(58) Field of Classification Search
   USPC ............................. 340/5.83; 713/186; 902/3
   See application file for complete search history.

(56) References Cited

U.S. PATENT DOCUMENTS

| | | | | |
|---|---|---|---|---|
| 3,138,059 A * | 6/1964 | White | | 396/15 |
| 3,174,414 A | 3/1965 | Myer | | |
| 4,728,186 A | 3/1988 | Eguchi et al. | | |
| 4,876,725 A * | 10/1989 | Tomko | | A61B 5/1172 356/71 |
| 5,233,404 A * | 8/1993 | Lougheed et al. | | 356/71 |
| 5,815,252 A * | 9/1998 | Price-Francis | | 356/71 |
| 5,828,773 A | 10/1998 | Setlak et al. | | |
| 6,198,836 B1 * | 3/2001 | Hauke | | G06K 9/00013 382/125 |
| 6,259,108 B1 * | 7/2001 | Antonelli et al. | | 250/556 |
| 6,954,260 B2 * | 10/2005 | Arnold | | G06K 9/2036 356/71 |
| 6,970,582 B2 * | 11/2005 | Langley | | G06K 9/00006 340/5.53 |
| 6,983,062 B2 * | 1/2006 | Smith | | G06K 9/036 348/229.1 |
| 7,073,711 B2 * | 7/2006 | Fernandez | | G06Q 20/206 235/380 |
| 7,203,344 B2 * | 4/2007 | McClurg et al. | | 382/115 |
| 7,308,122 B2 * | 12/2007 | McClurg et al. | | 382/124 |
| 7,347,365 B2 * | 3/2008 | Rowe | | 235/382 |
| 7,983,451 B2 * | 7/2011 | Super et al. | | 382/115 |
| 8,073,209 B2 * | 12/2011 | McClurg et al. | | 382/124 |
| 8,155,402 B2 * | 4/2012 | Kiyomizu et al. | | 382/124 |
| 2003/0133143 A1 * | 7/2003 | McClurg | | G06K 9/00013 358/1.14 |

(Continued)

*Primary Examiner* — Geepy Pe
*Assistant Examiner* — Asmamaw G Tarko
(74) *Attorney, Agent, or Firm* — Kenneth J. Lukacher Law Group; R. Stephen Rosenholm (57) ABSTRACT

An apparatus (10) for capturing fingerprint images having a platen (21) sized for at most two fingers of a hand, and an imaging system for enabling capture of fingerprint images presented to the platen (21), in which images of two different finger pairs are captured for each hand of a subject when presented to the platen. At least one processor (27) which determines for each of the images captured a difference in height of at least one characteristic of the fingers in the image. Using said difference in height of the fingers in each of the images, the processor (27) verifies that the correct sequence of specific ones of finger pair was provided by the subject to the platen when images were captured. Fingerprint images acquired from the images may be stored in an electronic record along with thumb prints and subject information, and optionally the height differences for the images.

25 Claims, 5 Drawing Sheets

(56) References Cited

U.S. PATENT DOCUMENTS

| | | | |
|---|---|---|---|
| 2003/0142856 A1* | 7/2003 | McClurg et al. | 382/124 |
| 2005/0180619 A1* | 8/2005 | McClurg et al. | 382/124 |
| 2007/0031014 A1* | 2/2007 | Soderberg | G06K 9/00093 382/125 |
| 2007/0067639 A1* | 3/2007 | Guillemot | G06K 9/00067 713/186 |
| 2009/0110249 A1* | 4/2009 | Miura et al. | 382/124 |
| 2011/0007951 A1* | 1/2011 | Mil'shtein et al. | 382/124 |
| 2012/0076369 A1* | 3/2012 | Abramovich et al. | 382/124 |
| 2012/0293642 A1* | 11/2012 | Berini et al. | 348/77 |

* cited by examiner

PRIOR ART

APPARATUS AND METHOD FOR DETERMINING SEQUENCING OF FINGERS IN IMAGES TO A TWO-FINGER SCANNER OF FINGERPRINT IMAGES

This Application claims the benefit of priority to U.S. Provisional Patent Application No. 61/260,355, filed Nov. 11, 2009, which is herein incorporated by reference.

FIELD OF THE INVENTION

The present invention relates to a fingerprint image capturing apparatus (or fingerprint scanner) providing imaging of at most two fingers at a time, and particularly to a fingerprint imaging apparatus and method for determining the sequence of fingers captured in images to check (or verify) that fingerprint images of the proper sets of two fingers prompted by the scanner or operator have been captured. Heretofore, such sequence determining capability was provided only for larger four finger scanners which required a simultaneous image of four fingers, but the present invention enables such capability with a smaller, lighter, two-finger scanner. Thus the present invention provides a high confidence level in ensuring the proper identification of individual fingers captured and ensuring validity of submission records of those fingers of a subject.

BACKGROUND OF THE INVENTION

Figure 1:
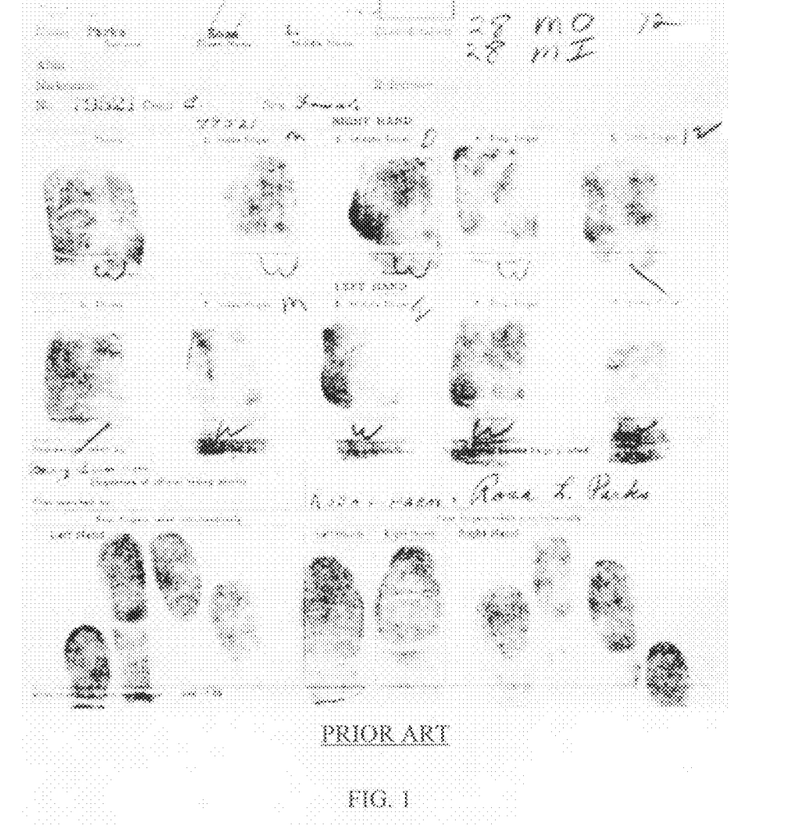
FIG. 1 is an example of Type-14 fingerprint record of the prior art.

When acquiring fingerprints of a subject, it is important that the sequence of the fingerprints are determined and checked to be correct in order to enable accurate searches and comparisons in an AFIS or other fingerprint database at a future date. For this reason, back when fingerprints were taken with ink on paper, the FBI created a Type-14 record where a subject rolls each of his 10 fingers, but also gives a flat impression of his 4 left fingers, his 4 right fingers, and then gives the flats of his two thumbs simultaneously, see FIG. 1 for example. In this manner, one can manually compare the fingerprints of the rolls with those of the flats to determine whether or not by accident or on purpose one or more fingers were rolled incorrectly—for example a left middle finger was rolled when a left ring finger or a right middle finger was required.

In present day, fingerprint capture is performed predominantly by optical means in a scanner and the same methodology that was applied to a Type-14 paper card is applied through the use of an FBI Appendix F certified optical scanner with a 3.0"×3.2" capture area. The optical scanner is capable of recording the fingerprints of a four-finger slap (and 2-thumb slap) in additional to the rolled fingerprint of each individual finger. Software in the scanner then compares the flats to the rolls in order to determine that the sequence of rolled fingerprint images was correct.

For certain applications, in particular mobile applications where the size and the weight of the fingerprint scanner may be critical, a 2-finger scanner may be preferential over a 4-finger scanner, since a 2-finger scanner is more portable being smaller in size and lower in weight than a 4-finger scanner. This is in sharp contrast to criminal bookings or background checks where the acquisition of 4-finger slaps as part of completing a Type-14 record has always been the standard.

Such a two-finger scanner has a housing with a platen surface (sized for imaging at most two fingers at a time) and optics in the housing directed to the platen for capturing images. As a result, 2-finger scanners cannot, unlike a 4-finger scanners which have a much larger platen and thus larger optics for image capture, simultaneously image all fingers (except thumb) of a subject's hand to provide a flat fingerprint image for typical comparison with individual fingerprints to determine that fingerprint images are each of the correct finger. Thus, it would be desirable to provide a two-finger scanner that assures a subject has properly presented fingers to the scanner's platen in images captured thereof for individual fingerprints as prompted to by the scanner or operator when completing the equivalent of a Type-14 record, even though a rolled finger print image of the hand cannot be performed due to the scanner platen's limited size

SUMMARY OF THE PRESENT INVENTION

Accordingly, it is an object of the present invention to provide an apparatus having a platen capable of imaging at most two fingers at a time that despite this limitation verifies the sequence of fingerprint image capture, such as needed when completing the electronic equivalent of a Type-14 record.

It is another object of the present invention to provide verification of the sequence checking of fingerprint images captured using a platen sized at most for two fingers which can be utilized in 2-finger scanners that is not limited to any particular imaging modality, such as frustrated total internal reflection (FTIR), dark-field illumination, non-FTIR imaging, touchless optical scanning, ultrasonic detection, or capacitance/impedance sensing.

Briefly described, the present invention embodies an apparatus having a platen sized for at most two fingers of a hand, and an imaging system for enabling capture of images of fingerprint presented to the platen, in which images of two different finger pairs of each hand of a subject are captured when presented to the platen. Processor(s) are provided which determines for each of the images captured a difference in height of at least one characteristic of the fingers in the image, and then using the difference in height of the fingers in each of the images the processor(s) verifies (or checks) that the correct sequence of specific ones of finger pair was provided by the subject to the platen when images were captured. Preferably, the processor(s) are part of the imaging system of the apparatus.

The characteristic may be the highest point of the fingers in the image, a crease along of each of the fingers in the image (such as the crease closest to the fingertip), or the distance from the highest point to the crease closest to the fingertip (i.e., highest point of the finger) of each of the fingers the image. Preferably, the height characteristic is measured along the direction of the finger.

To enable such verification, different verification checks are performed:

(1) The processor(s) use the height difference determined in each single image captured as being indicative of the sequence each finger of the finger pair in the image was situated when presented to the platen for imaging by the imaging system. For example, the processor(s) compare the height difference value for the finger pair image to that expected for the finger pair when the image was captured for the human hand, such as the difference value being within a margin of an acceptable threshold value (magnitude and/or sign (+ or −)).

(2) The processor(s) use the height difference determined for two images captured each associated with different finger pairs of the same hand as being indicative of the sequence the finger pairs of the two of the images were each presented to the platen for imaging by the imaging system. For example, the processor(s) compares the height difference values of the two different finger pair images for a single human hand to that expected for the two finger pairs when the images were captured, such as the subtracted value of the two height difference value of each of the two images as being within a margin of an acceptable threshold value (magnitude and/or sign).

(3) The processor(s) use the height difference determined for two images captured each associated with corresponding ones of finger pairs of different hands of the subject as being indicative of the sequence the finger pairs of the two images were each presented to the platen for imaging by the imaging system by such difference in height for the two images being approximately the same in absolute magnitude. For example, the processor(s) compares the height difference values of the two different finger pair images for human hands to that expected for the two finger pairs when the images were captured, such as the subtracted value of the two height difference value of each of the two images as being within a margin of an acceptable threshold value (magnitude and/or sign). The acceptable threshold values for the above three cases are stored in memory of the apparatus.

The processor(s) as part of the verification may further check that no two fingerprint images acquired from captured images are from the same finger of the subject.

After verification, the processor(s) acquires fingerprint images from each of the images, and stores the fingerprint images in memory of the apparatus as an electronic fingerprint record for the subject along with other information, such as segmented right and left thumb fingerprints of the subject captured in images by the apparatus, and information pertinent to the subject as typical of an electronic fingerprint record.

Optionally, the height difference for one or more of images may be stored along with the electronic record or in a separate record for the subject. If multiple height characteristics were determined, then each height characteristic may be stored in associated with the type of measurement made.

Processing of images may be carried out by processor(s) contained within the housing of the apparatus or in a computer system (or other microprocessor based system) coupled by cable or wirelessly to the apparatus, or by processors in both the apparatus and computer system.

Preferably, the apparatus has a detection mechanism (optical and/or non-optical) and electronics for enabling capture of fingerprint images presented to (with pressure against or not) a platen sized for enabling capture of at most two fingers of a subject's hand at a time. Such electronics having programmed one or more processor(s) enabling a biometric application (or operator) to prompt the subject to present in a sequence finger pairs from each hand to the platen, to capture an image of each finger pair when presented, and to determine from characteristic(s) of the fingers in the image(s) whether the prompted finger pairs correspond to the fingers captured. Such characteristics may represent one or more of the height difference between the two fingers, or difference between creases of each finger, presented in the image.

Thus the software operating in the processor(s) determines if the correct two-finger pairs that are prompted for during a fingerprint capture session are actually the fingers presented in response to the prompt. If not the user and/or subject is notified of the error and the session is repeated. As such the sequence checking is not solely dependent upon comparing an image of flats to rolls as in prior art. The present invention provides a high confidence level ensuring the proper identification of individual fingers captured and ensuring validity of submission records of those fingers in a 2-finger imaging apparatus or device.

The present invention also embodies a method for capturing fingerprint images of a subject on a finger print scanner having a platen comprising the steps of prompting a subject to place one specific pair of fingers from one hand on a platen of a finger printer scanner, capturing a first image of fingers presented on the platen after the prompting step is carried out, determining a first difference in height of at least one characteristic (e.g., highest point or corresponding crease) of the fingers in the image, and determining whether the first difference in height is consistent with a presentation of the two specific pair of fingers prompted for.

The method may then be repeated for the other finger pair of the same hand by prompting the subject to place a different one of specific pair of fingers from the same hand on the platen of the finger print scanner, and capturing a second image of the fingers presented on the platen, determining a second difference in height of the fingers in the image, and then determining the difference between the first height difference and the second height difference as to whether such is consistent with a presentation of the sequence of the two pairs of fingers in the two images when each was prompted for. The above steps of the method may then be repeated to obtain first and second images of the other hand of the subject, and then determining whether the first height difference for corresponding finger pairs of different hand are approximately the same in absolute magnitude, and whether the second height difference for corresponding finger pairs of different hands are approximately the same. The fingerprints from the images may then be in an electronic record along with other images and information needed to complete the electronic record.

Although preferably the difference in height is of at least one of the highest point or corresponding crease (e.g., first crease from fingertip) of the fingers in the image, the difference may be in any characteristic of the fingers attributable to the difference in height of the fingers in the image.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 2:
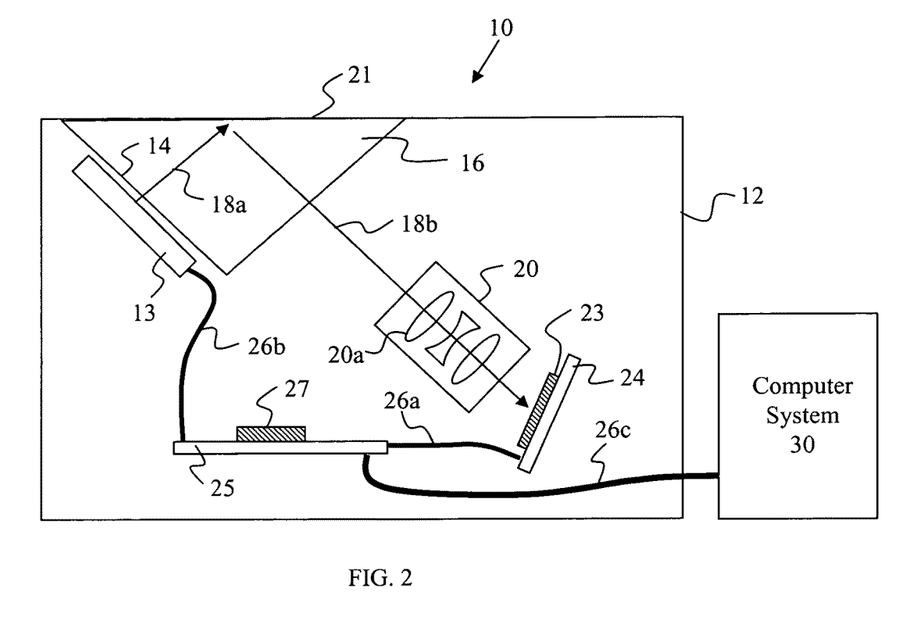
FIG. 2 is block diagram of an apparatus (or two-finger scanner) of the present invention operating in accordance with software to enable the present invention.
Figure 3:
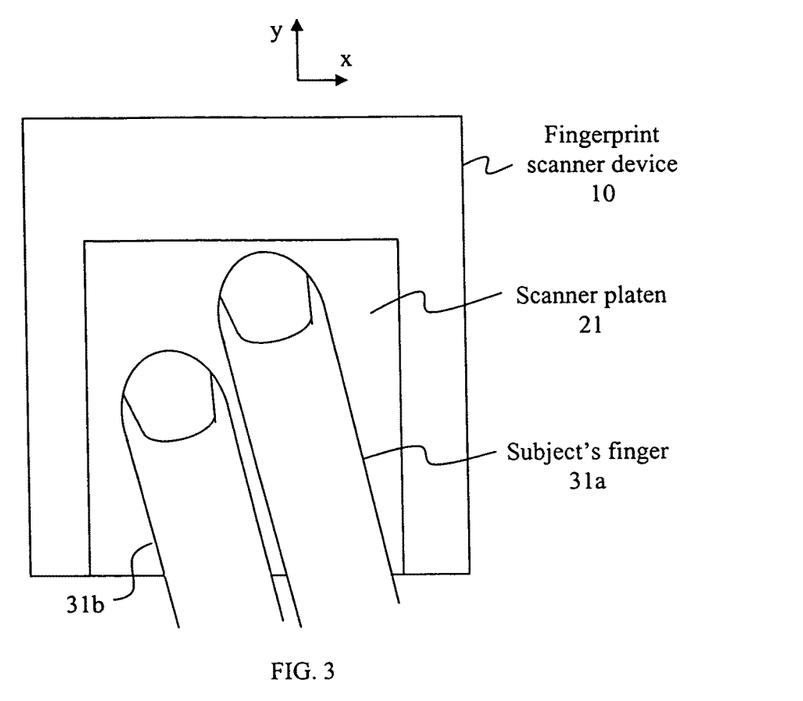
FIG. 3 is a top view of a two fingerprint scanner platen of FIG. 2 which at most two fingers can be presented at one time and showing an example of a pair of fingers.

Referring to FIG. 2, an apparatus 10 for capturing fingerprints of two fingers or less of a hand as shown for example in FIG. 3. The depicted fingerprint scanner is a schematic of an optical scanner operating based on bright-field illumination and using the principle of frustrated total internal reflection (FTIR) to capture and record the presented fingerprints. Other imaging systems may be used in apparatus 10, as the image analysis described below in connection with FIGS. 4A and 4B may be applied to any fingerprint scanner designed to capture 2-fingers operative, by way of example, dark-field illumination, non-FTIR imaging, touchless optical scanning, ultrasonic detection, or capacitance/impedance sensing.

In the particular imaging system shown in FIG. 2, a housing 12 has an illumination source 13 for sending light through one facet 14 of a prism 16 that is substantially transparent at the wavelength of light source operation. Light (denoted by ray 18a) from the illumination source strikes platen 21 and reflected light (denoted as ray 18b) then propagates through an objective lens 20 (composed of one or more optical imaging elements 20a) which focuses the reflected light onto two-dimensional (2-D) sensor or detector 23. The reflected light represents an image of the surface topology of the skin or the finger(s) presented to platen 21 at or about the fingertips as typical of fingerprints. Sensor 23, by way of example, may be a complementary metal-oxide semiconductor (CMOS) or charge-coupled device (CCD) sensor that is mounted to a circuit board 24 and connected, via power and communication cable 26a, to a main circuit board 25 of the apparatus 10. Each image captured may represent a two dimensional array of pixel each having a gray scale value. Other components than those described above for capturing an image may be present in apparatus 10 depending on the type of imaging system utilized in the apparatus, such as dark-field illumination, non-FTIR imaging, touchless optical scanning, ultrasonic detection, or capacitance/impedance sensing. The platen 21 may be that of a typical optical fingerprint scanner or a fingerprint scanner employing other types of fingerprint imaging (e.g., electroluminescent, impedance tomography, acoustic, or capacitance sensing), but still capable of capturing a digital image of the subjects fingerprints.

The main circuit board 25 contains electronics having one or more processors 27 that allow it to control the sensor 23, via cable 26a and the illumination source 13 via cable 26b as well as performing image processing, if needed, of the image captured and received from sensor 23 of the two or less fingerprint(s) as typical of a fingerprint scanner. The apparatus 10 may be coupled by power and communication cable 26c or wirelessly to computer system 30 or other microprocessor based system having processor(s) for processing of images captured by apparatus 10 received from processor(s) 27, and/or such processing may be carried out by processor(s) 27 in housing 12. The computer system 30 and/or processor(s) 27 may store fingerprint images segmented from images captured by apparatus 10 in memory (e.g., memory on circuit board 25 accessible to processor(s) 27 and/or computer system 30 to store the electronic equivalent of a Type-14 record for subjects.

The processor(s) 27 operate in accordance with software (program instructions) in memory, such as on circuit board 25, or in processor(s) 27 for enabling image capture and storage, and image processing as typical of a two-finger print scanner with the improvement being provided by enabling determining of sequencing in images of pairs of fingers captured as described below in connection with FIGS. 4A and 4B.

Figure 4A:
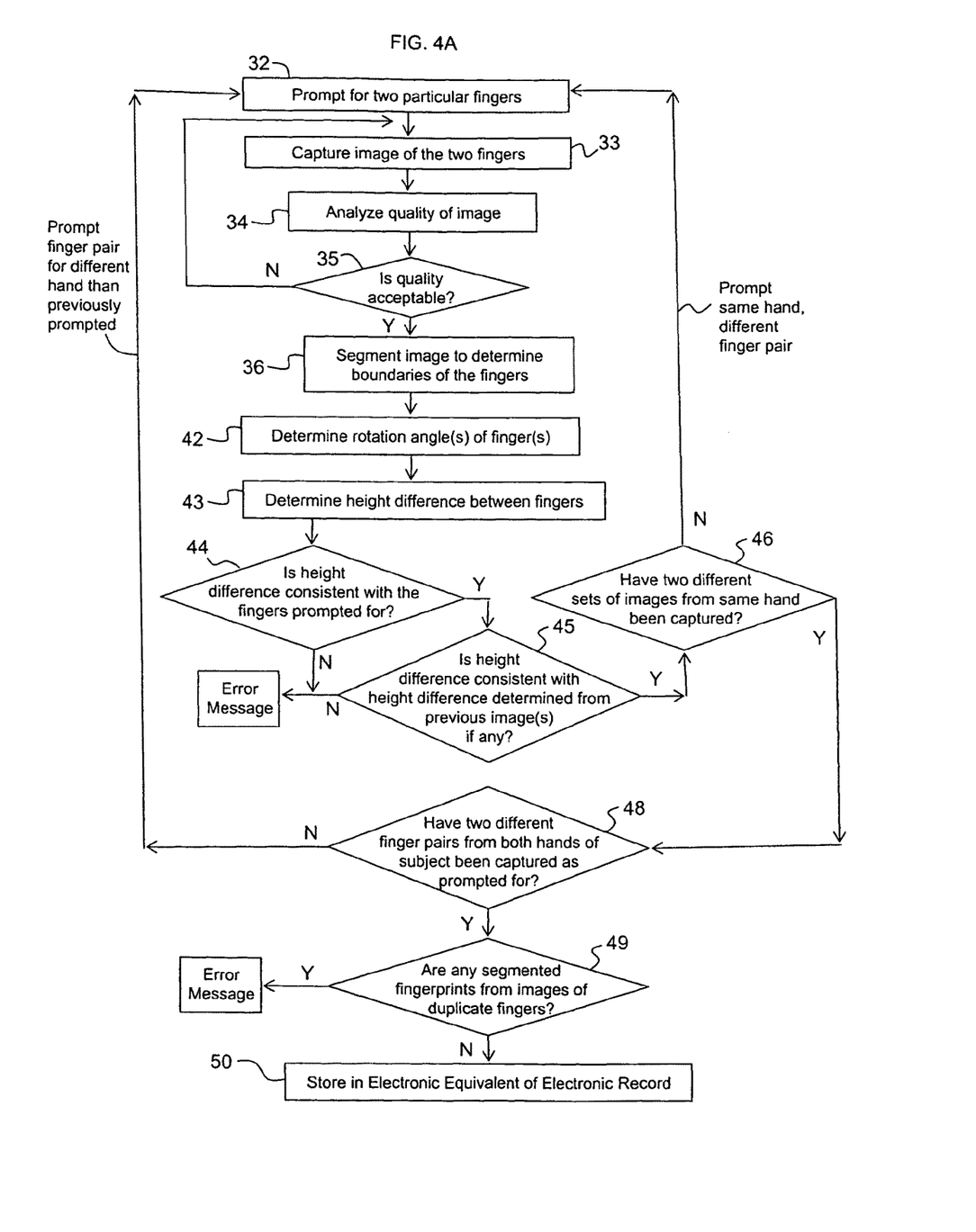
FIG. 4A is a flow chart of the process for capturing and analyzing images of fingerprints for the apparatus of FIG. 2.

The operation of the apparatus 10 is shown in the flow chart of FIG. 4A. The subject is prompted to place two fingers (a finger pair) on platen 21 of one of his or her hands, which by way of example may be a right index and right middle fingers (step 32). Such prompting may be accomplished through verbal commands, such as by a speaker incorporated into the apparatus 10, or by an operator, or said prompting may be through words or icons illuminated by the device via pictograms or LCD/LED screens of the apparatus. Alternatively, or in addition to, audible beeps may be used in conjunction with pictograms to indicate which finger pair to present to the apparatus.

In step 33, the illumination source 13 is operated to capture an image of the fingerprints presented on platen 21 on sensor detector 23, as described earlier. Other components, other than components 13-23 may be used in apparatus 10 depending on the type of imaging system in apparatus 10 for enabling capturing of an image of fingerprints. The hardware, firmware and/or software of processor(s) 27 conduct a pre-analysis of the image to identify that fingers have been placed on the platen 21 and are of sufficient quality for further analysis (step 34). By way of example, fingers being placed on the platen can be detected by looking for changes in the image from one frame to another and/or via segmentation. Such as described for example at [http://en.wikipedia.org/wiki/Segmentation_%28image_processing %29] and blob detection [http://en.wikipedia.org/wiki/Blob_detection]. Preferably, a check is also made as to whether or not a sufficiently large area of the fingerprint has been captured to prompt further analysis. Additionally, the processor(s) 27 in performing such pre-analysis of the captured images may prompt the subject to press harder or move their fingers, for example to the right, left, up, or down, to enable a better image of the intended two fingers to be captured and acquired. If the quality is not acceptable, the apparatus 10 captures a second fingerprint image (repeating step 33) and repeats the fingerprint pre-analysis process. By way of example of step 34, a fingerprint image may not be of acceptable quality if the image contrast is too low, an insufficient area of the fingerprint is captured, or an insufficient number of minutiae points are detected.

Figure 4B:
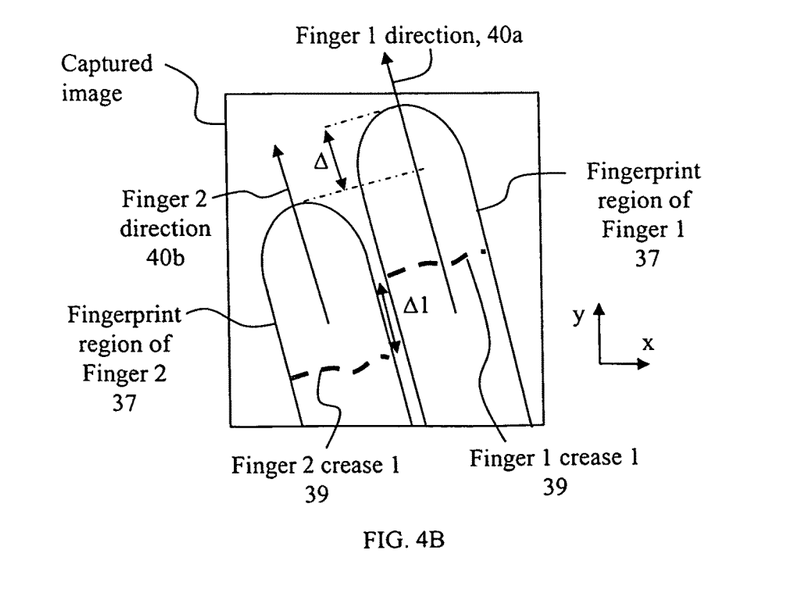
FIG. 4B is an example of an image captured by the apparatus of FIG. 2 showing the analysis for determining sequencing of the fingers of FIG. 3 presented to the platen.

If the fingerprint image quality is deemed acceptable, the fingerprint image is then segmented at step 36 in order to determine the boundary (pixels) of the fingerprint region 37 of the two fingers, such as boundary of each region 37 in the example image of FIG. 4B. Next, the rotation angle of the fingerprint(s) with respect to the one of the axes 38 (x or y) of the image is determined (step 42). The rotation angle of the fingerprint is the angle between the direction of one or both fingers, as denoted by arrows (or virtual line) 40a and/or 40b in FIG. 4B for fingers 31a and 31b, respectively, and one of the axes 38, such as the y-axis of the image.

For example, the direction (or virtual line) of a finger in the image may be determined using points (pixels) in the image along one or both side along boundary of each region 37 of the finger. In such a manner separate rotation angles for each finger are measured. Alternatively, the fingerprint outlines of both fingers 31a and 31b provided by boundary of each region 37 may be used to determine an average finger rotation relative to one of the image axes 38, or the rotation angle of one of the fingers may be used as the rotation angle for both fingers.

Alternatively, or in addition to, the average orientation angle of the $1^{st}$ crease 39 (the crease closest to the fingertip) of each finger is determined and from that determine the finger direction based upon the assumption that the crease direction or (a virtual line associated with the crease) is perpendicular to the finger direction. Pixels in the image associated with the first crease are locatable as such transverses approximately perpendicular to the side boundary of each finger closest to the tip of the finger, and then curve fit to a line representing the crease from which a perpendicular finger direction line determined. As a further alternative, or in addition to, the collection of fingerprint pixels in an image attributed to a single finger may be curve fit to a line to determine the finger direction and hence rotation angle. In this manner, the processor(s) 27 may determine the direction and rotation angle of least one finger in the image in accordance with a linear direction of image elements (pixels) representing of one of said fingers in the image, or approximately perpendicular to a linear direction associated with image elements (pixels) representing a crease of one of the fingers in the image.

Using the rotation angle and the fingerprint boundary information obtained at steps 36 and 42, respectively, the processor(s) 27 at step 43 determine the height difference Δ between the two fingers in the image (i.e., difference between highest points of boundary pixel(s) of each finger along a common dimension of the image). The height difference Δ can be determined, by way of example by rotating the image to a new coordinate system that is aligned with the platen axis x or y, or may be determined by not rotating the image, but measuring the height difference along the directions 40a and 40b of fingers 31a and 31b, respectively. If there are two finger directions calculated, these separate rotations can be accounted for in terms of measuring the height difference between the two fingers. The height difference value determined may be in terms of the number of pixels subtracted between highest points of boundary pixel(s) of each finger along a common dimension of the image, or the height difference value may be converted or scaled into other value, such as related to the relationship between pixels and length along the platen.

By way of example, rotation of one or both fingers may be performed by using the angle of rotation of one or both of the fingers to rotate a copy of the image in memory accessible to the processor(s) 27 to ensure that one or both fingers are vertical. Optionally significant points of the finger image are determined in the original image (for example, those points near the fingerprint tip or those points near the first crease) and only those points are rotated to increase performance/speed. The highest point is then determined of the left finger and the highest point is determined of the right finger, where left and right are in reference to the finger's placement in the image.

Since the fingers may be rotated with respect the imaging system, preferably the height characteristic for each finger is measured at step 43 along the direction of the finger in the image captured at step 33, and then step 42 and subsequent rotating of image (or image elements thereof) may be skipped.

Alternatively, or in addition to the height difference Δ being determined, a height difference Δ1 may be determined between the 1$^{st}$ crease 39 (from the fingertip). Pixels in the image associated with the first crease are locatable as such transverses approximately perpendicular to the side boundary of each finger closest to the tip of the finger. The height difference Δ1 may be determined similar to the calculation of Δ, but with location of the creases in the image being used rather than the highest points of the fingers in the image. For example, by rotating the image by the rotation angle, the creases are then at or approximately parallel to the same one axis of the 2-D image, and then subtracting the pixel position along the other axis of the image provide the height difference value, or such height distance value may determined without such rotation along the direction 40a or 40b. Also, other height differences may be determined, such as difference in the distance between first crease and fingertip of the fingers.

At step 43, the height difference Δ and/or Δ1 determined are stored by processor(s) in memory in associated with the image. Only one of these height difference values need be used for subsequent processing.

The height difference provides an indication as to whether or not the correct two fingers have been placed on the platen 21. By way of example, the two fingers presented to the platen 21 of device 10 drawn schematically in FIG. 3 may be the correct right index and middle finger the apparatus and/or operator prompted the subject for. For this case, it is expected that the finger placed on the left-side of the platen is shorter than that finger placed on the right-side of the platen (this may be opposite of how the fingers appear in the image depending upon the technology or electronic readout scheme of the apparatus, but this can be accounted for in software). Thus, at step 44, the processor(s) 27 check whether the height difference information obtained in step 43 is consistent with fingers prompted for at step 32. For the case of the subject being prompted to present his right index and right middle fingers, if it is determined that the middle finger is not taller than the index finger within a given margin of error, the processor(s) 27 issues an error message. This error message may be relayed to the subject or operator that the wrong fingers may be placed on the platen. The operator may, at his discretion, override the error and accept the print of the subject or can initiate a rescan of the required fingers, for example the right index and middle fingers at step 33. In this manner, the difference in height associated with the fingers in the image are indicative of the sequence each finger of the finger pair in the image was situated when presented to the platen for imaging by the imaging system, thereby verifying (checking) that the proper finger pair was captured in the image.

At step 45, a consistency check with any previous image(s) is performed. As no other images of other finger pairs have yet been captured, no inconsistency exists and processing continues to step 46.

As two images of two different sets of fingers from the same hand are needed for electronic the equivalent of a Type-14 record, a check is made at step 46 if both such images have been captured from the same hand as prompted for at step 32. If not, step 32 repeats but with a different prompt, in which the subject is prompted to present to the platen 21a different second set of two fingers (a different finger pair) from the same hand as the finger pair of the previously captured image. For example, subject may be prompted to present his right ring and right little fingers. Steps 33, 34, 36, 42, and 43 are performed as described earlier, in which an image of the fingers on the platen 21 are captured in memory of the processor(s) 27 or memory accessible to the processor(s), and a determination is made as to whether the fingers have been placed on the platen and are of sufficient quality to begin analyzing. If so, the image is then processed to obtain boundaries (step 36), to determine angle of rotation of one or more fingers (step 42), and then using the rotation angle and the segmented fingerprint information from steps 36 and 42 the height difference (Δ and/or Δ1) of the fingers is determined and stored in association with the image (step 43). At step 44, the processor(s) 27 determine if the height difference is consistent with the two fingers the subject has been prompted for at step 32 for this different second set of two fingers. For example, if the right ring and little fingers were requested, the ring finger should be taller than the little finger. If not, an error message is provided, as described earlier.

Since the height difference of two different pairs of images from the same hand as been determined, another sequence check is performed at step 45, the processor(s) 27 compare the height difference between the current captured image and one or more previously analyzed images. For comparisons of two fingers to two different fingers of the same hand (or of the corresponding hand), the processor(s) 27 expects to see a difference. For the example specified above, the processor(s) 27 expects the height difference between the ring and little finger to be more than that between the middle and index finger within a predetermined margin. If in step 45 the height difference of the analyzed image is not consistent with the previously captured fingers as just described, an error message is issued by the processor(s) 27. This error may be relayed as an error message to the subject and/or operator that the wrong fingers may be placed on the platen. The operator may, at his discretion, override the error and accept the fingerprint image or initiate a rescan of the right ring and little fingers at step 33. In this manner, the height determined for two of the images each associated with different finger pairs of the same hand are indicative of the sequence the finger pairs of the two of the images were each presented to the platen for imaging by the imaging system, thereby verifying (checking) that the proper finger pairs were captured in such images.

Again, a check is made at step 46 if both such images have been captured from the same hand as prompted for at step 32. If so, step 48 is performed, otherwise step 32 repeats with a different prompt, in which the subject is prompted to present to the platen 21a different second set of two fingers from the same hand as the finger of the previously captured image. Steps 33, 34, 36, 42, 43, 44, 45, and 46 are performed as described earlier.

A check is made at step 48 to determine whether the fingers of both hands have been captured and processed. If not, the process returns to step 32 to prompt the subject to place a finger pair of the other hand not yet prompted previously at step 32 on platen 21, and then steps 33, 34, 35, 36, 42, 43, 44, 45, and 46 are performed as described earlier with respect to this finger pair, such as the left middle and index fingers. However, at step 45 the sequence check uses height difference determinations for different finger pairs of the same hand (as described earlier), and from corresponding finger pairs of different hands. For example, if the ring and little finger of the right hand are being analyzed, the height difference is compared to one or more of the following height differences: that of the right index and middle, that of the left ring and little fingers, and that of the left right index and middle. For the case of comparing two fingers of one hand to the same two fingers of the opposite hand, the height difference should be the same (within an acceptable margin). For comparisons of two fingers to two different fingers of the same hand (or of the corresponding hand), the processor(s) 27 expects to see a difference. For the example specified above, the processor(s) 27 expects the height difference between the ring and little finger to be more than that between the middle and index finger within a predetermined margin. This, in this manner the difference in height determined for two of the images each associated with corresponding ones of finger pairs of different hands of the subject are indicative of the sequence the finger pairs of the two images were each presented to the platen for imaging by the imaging system, thereby verifying (checking) that the proper finger pairs were captured in such images.

Again, a check is made at step 46 if both such images have been captured from the same hand as prompted for at step 32. If so, step 48 is performed, otherwise step 32 repeats with a different prompt, in which the subject is prompted to present to the platen 21a different second set of two fingers from the same hand as the finger of the previously captured image. For example, the subject may be prompted to present his left ring and left little fingers to platen 21, rather than the left index and middle fingers of the previously captured image. Steps 33, 34, 36, 42, 43, 44, 45, and 46 are performed as described earlier, in which step 45 the sequence check uses height difference determinations for different finger pairs of the same hand, and from corresponding finger pairs of different hands, as described earlier.

As the two different finger pairs from each of hands have been captured at the check of step 48, process continues to step 49 to check for duplicate fingerprints. This is needed since if a subject (i.e. person) places their left middle and index instead of right middle and ring, the above described sequence will not catch the error immediately, but will catch the error with subsequence scans because either a duplicate finger will be placed, or two fingers will have two different finger directions in the same image that is not consistent with how a willing subject would place their fingers. For example, if the left middle and index were placed in lieu of a right middle and ring, so that there is no finger duplication, the subject would have to simultaneously place their left index and pinky on the platen and this would result in an odd finger direction for each finger (for example they would be tilted towards each other and not parallel or slightly away as in a normal finger position). Such an unusual orientation is detected by the processor(s) 27 and flagged as a potential error (error message issued).

By way of example, consider a subject having hands where the little finger is 28 mm shorter than the ring finger and whose index finger is 12 mm shorter than the middle finger. Further, consider that only the height difference characteristic $\Delta$ is measured as part of the flowchart of FIG. 4A, though in general the given example may be expanded to also or alternately include the crease height differences between respective fingers. If in step 32 the apparatus initially prompts the subject to put his left little finger and left ring finger on platen 21, processors(s) 27 expect to measure a positive height characteristic $\Delta$ (i.e., the sign of the height difference is +). If the subject instead places his right little finger and ring finger on the platen 21 or if he places right middle finger and index finger, then the measured height characteristic $\Delta$ will be negative (in sign) or in terms of pixel value (or actual or scaled value) about −28 mm and −12 mm, respectively, and step 44 will issue an error. If on the other hand, the subject places his right index and right middle finger down, processor(s) 27 would measure a positive height characteristic $\Delta$ in terms of pixel value (or actual or scaled value) of about 12 mm. Depending upon the tolerance (margin) settings and whether or not the processor(s) have access to additional data on the subject step 44 may or may not issue an error. For example, if the height characteristics of the individual are stored in a database (in apparatus 10 or computer system 30 memory) and accessible for step 44, then an error would be issued. Alternatively, the demographics of the individual including age, sex, and height may be accessible for step 44 and knowing the individual is not a child and/or is not particular short, may issue an error at step 44. If an error is not issued, and it being the first finger pair requested, the process returns to step 32 and may prompt for the left middle and left index finger. In this case, a negative height characteristic $\Delta$ is expected, so placing the left index and left middle or the right index and right middle would result in a positive height characteristic and hence an error being issued at step 44. If instead the subject places his right little and right ring fingers on platen 21, the height characteristic $\Delta$ would be measured in terms of pixel value (or actual or scaled value) about −28 mm, and so step 44 would not issue an error code. However, at step 45 mm the height characteristic $\Delta$ in terms of pixel value (or actual or scaled value) of −28 mm is compared to the previously captured height characteristic $\Delta$ in terms of pixel value (or actual or scaled value) of +12 mm, and given that an extremely high percentage of humans have the little finger significantly shorter than the ring finger which is not the case for the middle to index finger, step 45 would most likely issue an error.

The apparatus can also acquire other information needed to complete electronic equivalent of a Type-14 record for the subject. For example, the apparatus may be operated before or after the processing of FIG. 4A to prompt subject to present to the platen 21 his or her right and left thumbs in separate images or the same image, and if image quality is proper (as described earlier), such the thumbprints are segmented there from.

If there are no duplicate images of segmented fingerprints at step 49, the fingerprint images segmented by processor(s) 27 from the four images (two different finger pairs from the right hand and two different finger pairs from the left hand) are stored in memory along with other information needed to for an electronic equivalent of a Type-14 record for that particular subject (step 50). The fingerprint images are stored in such memory record such that each fingerprint image can be individually identified as being associated with a particular one of the fingers or thumbs of the subject, as typical of electronic fingerprint records. Although processor(s) 27 are described as providing the above operation, the processing of images may be provided by computer system 30. Optionally, the height characteristic $\Delta$ for one or more of images may be stored along with the electronic record or in a separate record for the subject in association with finger pair type (right, left, pair [little, ring] or [middle, index]) for the image from which height characteristic $\Delta$ was determined. If multiple height characteristics (e.g., $\Delta$ and $\Delta 1$) are determined at step 43, then each height characteristic $\Delta$ may be stored in associated with the type of measurement made.

Figure 5A:
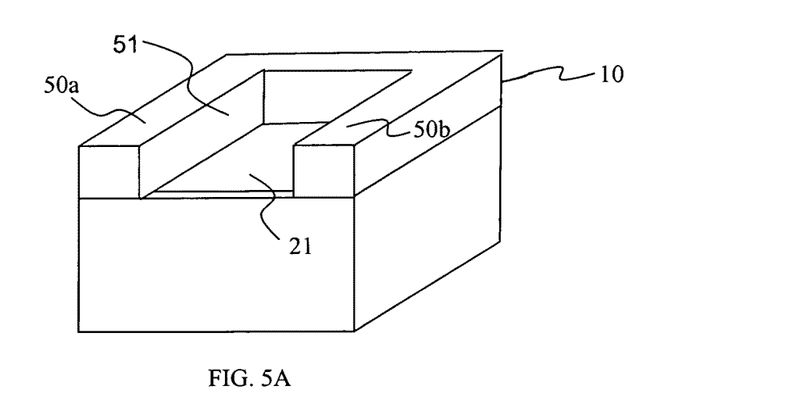
FIGS. 5A and 5B are examples of a guiding mechanisms that minimize the angle of rotation of the subject's fingers relative to the platen of FIGS. 2 and 3.
Figure 5B:
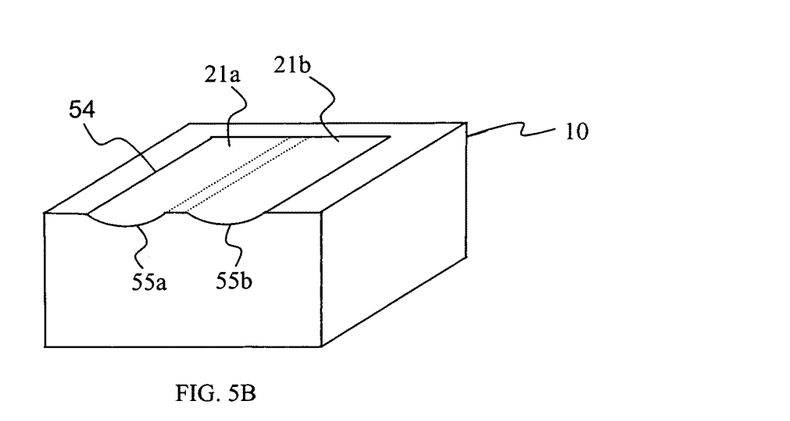

For certain fingerprint scanners, the amount of fingerprint rotation may be minimal. This may be the case for a fingerprint scanner that has walls along the sides of the platen that prevent the subject's fingers from hanging over the edge of the platen. Alternatively, a fingerprint scanner may squeeze or otherwise guide fingers to be primarily along the y-axis indicated in FIG. 3. In this case and/or for the purposes of computational speed, the rotation angle is not calculated (step 42 skipped in the processing described above) and the height difference is calculated at step 43 without it, for example by determining the points (pixels) with the highest y-value in each of the two fingers segmented and determining the height difference $\Delta$ is the difference in y values of each of these two points. Similarly, the height difference $\Delta 1$ may be determined using one of the points (pixels) associated with the first crease in each of the fingers in the image. Examples of guide mechanisms are shown in FIGS. 5A and 5B that guide the subject's fingers along a particular axis of the platen 21. In the example of FIG. 5A, a guide 51 is provided having left and right sidewall 50a and 50b, respectively, bordering platen 21 along the housing of apparatus 10. In order for the two fingers of a subject to make full contact with the platen 21, the subject must align his/her fingers in a direction parallel (or approximately parallel) to the interior surface of the left and right sidewall 50a and 50b. Guide 51 may be of other shape or curvature in order to provide the desired alignment when images are captured. The guide 51 may be a single unit or composed of multiple pieces that adjoin each other. In another example of FIG. 5B, the platen 21 is comprised of two portions 21a and 21b that have concave shapes illustrated by 55a and 55b. The concave shapes provide a guide forcing the subject's fingers to align relative to platen edge 54, thereby minimizing any rotation angles that effect the calculation of height characteristics previously discussed. In this manner, means may be provided along the platen 21 of the apparatus 10 limiting the amount of possible rotation of fingers when presented to the platen to enable the fingers to extend in a direction at least approximate with one of axes of images captured by the imaging system.

Optionally, the subject may be prompted to roll each of his or her fingers upon the platen to obtain a roll image of each finger, the roll image of each finger are stored in memory by the processor(s) 27. Fingerprint images segmented by processor(s) 27 from the roll fingerprints may also be stored in the electronic record described earlier. If desired, each roll image may be compared to fingerprints acquired from previously captured finger pair images by processor(s).

A user interface may also provided for apparatus 10 having a display and keys along housing 12 and/or computer system 30 to enable the operator and/or subject to interact with the processor(s) 27 to enable capture of the fingerprints described above. Part of such user interface may include speakers (audio), and/or icons, pictograms, or LCD/LED screens (visible), or other components which under control by processor(s) 27 (or via computer system 30) which prompt the operator and/or subject as to which of the subject's hands and which fingers of such hand to present to the platen 21 for scanning. Such user interface may also enable entry of other information (e.g., text fields) to be associated with the fingerprints captured, if needed, as typical of Type-14 electronic record, for storage in memory of apparatus 10 and/or computer system 30 in association with such captured fingerprint images. Power to components of apparatus 10 may be provided via connector/cable 26c from the computer system 30, or a rechargeable battery within housing 12, or power supplied externally via an AC power adapter.

From the foregoing description, it will be apparent that there have been provided an improved apparatus and method for a two fingerprint imaging apparatus and method to enable capture of fingerprints and determination as to whether the correct two-fingerprint slap images captured on the two-finger scanner were captured in response to a biometric application prompt for a specific finger pair. Variations and modifications in the herein described apparatus, method, and system in accordance with the invention will undoubtedly suggest themselves to those skilled in the art.

The invention claimed is:

1. An apparatus for capturing images of fingerprints comprising:
   a platen sized for at most two fingers of a hand of a subject at one time;
   an imaging system for capturing images of different finger pairs of each hand of a subject when presented to said platen; and
   at least one processor which is configured for initiating a fingerprint capture session with a subject by prompting of the subject for a presenting of a correct sequence of specific ones of fingers within a specified finger pair, onto said platen, and for scanning an image of said specified finger pair, and for determining in said image, a difference of at least one characteristic of said fingers in the image, and configured for verifying if said presenting of said finger pair is correct in accordance with said prompting, and
   configured for notifying the subject of an error with respect to said presenting, and for repeating the initiation of a fingerprint capture session, if a sequence of specific ones of fingers of said presenting of said specified finger pair is not verified to be correct.

2. The apparatus according to claim 1 wherein for each of said images said at least one processor uses the difference in height of each finger associated with the image as being indicative of the sequence each finger of the finger pair in the image was situated when presented to the platen for imaging by the imaging system.

3. The apparatus according to claim 1 wherein said at least one processor uses the difference in height determined for two of the images, each image associated with a different finger pair of the same hand as being indicative of the sequence the fingers within each finger pair of said two of the images, that were each presented to the platen for imaging by the imaging system.

4. The apparatus according to claim 1 wherein said at least one processor uses the difference in height of fingers determined for two of the images, each image associated with corresponding ones of finger pairs of a different hand of the subject, as being indicative of the sequence the fingers within said finger pairs of said two of the images were each presented to the platen for imaging by the imaging system by being approximately the same in absolute magnitude.

5. The apparatus according to claim 1 wherein said at least one processor acquires fingerprint images for each of said images and verifies that no two fingerprint images are from the same finger of the subject.

6. The apparatus according to claim 1 wherein said imaging system utilizes said a least one processor.

7. The apparatus according to claim 1 wherein said at least one processor determines said difference in the height of each of said images by determining the direction of at least one of said fingers in the image, and said difference in height is the difference in the relative position of the ends of the fingers in the image along said direction.

8. The apparatus according to claim 7 wherein said at least one processor determines the direction of least one of said fingers in accordance with a linear direction of image elements representing of one of said fingers, or approximately perpendicular to a linear direction associated with image elements representing a crease in said at least one of said fingers.

9. The apparatus according to claim 1 wherein said at least one processor determines said difference in the height of each of said images by determining direction and angle of rotation of at least one of said fingers in the image with respect to one of two axes associated with the image and rotates the image or points associated with the image in accordance with said angle of rotation to align the fingers in the image along said direction with one of said two axis of the image, and said difference in height is the difference in the relative position of the ends of the fingers in the image along said aligned one of said two axis of the image.

10. The apparatus according to claim 9 wherein said at least one Processor determines the direction of least one of said fingers in accordance with a linear direction of image elements representing of one of said fingers, or approximately perpendicular to a linear direction associated with image elements representing a crease in said at least one of said fingers.

11. The apparatus according to claim 1 further comprising memory, wherein said at least one processor acquires fingerprint images from each of said images and stores said fingerprint images in an electronic record for the subject in said memory.

12. The apparatus according to claim 1 further comprising memory, wherein said at least one processor stores the difference in height of said least one characteristic of fingers for each of the said images in said memory.

13. The apparatus according to claim 1 wherein for each of the images said characteristic is the highest point of each of the fingers of the image.

14. The apparatus according to claim 1 wherein for each of the images said characteristic is a corresponding crease of each of the fingers in the image.

15. The apparatus according to claim 14 wherein said corresponding crease is the crease closest to the tip of each of the fingers.

16. The apparatus according to claim 1 wherein for each of the images said characteristic is the distance from the highest point to the crease closest to the highest point of each of the fingers of the image.

17. The apparatus according to claim 1 further comprising means for limiting the amount of rotation of fingers when presented to the platen to enable the fingers to extend in a direction at least approximate with one of axes of images captured by the imaging system.

18. A system for capturing fingerprint images comprising:
  means for prompting for presenting of specific ones of fingers and enabling capture of fingerprint images presented to a platen sized for at most two fingers of a hand, in which two images of two different finger pairs are captured for each hand of a subject; and
  means for processing images captured to determine one or more characteristic of fingers in the images as to whether the fingers captured in each of the images correspond to specific ones of the fingers, in accordance with said prompting, when presented to the platen.

19. The system according to claim 18 wherein said one or more characteristics is one or more of highest point of each of the fingers of the image, or in accordance with the location of a crease of each of the fingers in the image.

20. A method for capturing images of fingerprints upon a platen sized for at most two fingers of a hand of a subject comprising the steps of:
  prompting a subject for presenting of specific ones of fingers of finger pairs; and
  capturing images of two different finger pairs of each hand of a subject when presented to a platen; and
  determining in each of the images a difference of at least one characteristic of fingers in the image;
  verifying that specific ones of finger pairs was presented by the subject to the platen, in accordance with said prompting, after one or more said images were captured using said difference determined for said one or more said images.

21. The method according to claim 20 wherein for each of the images said characteristic is one or more of highest point of each of the fingers of the image, or in accordance with the location of a crease of each of the fingers in the image.

22. A method for capturing fingerprint images of a subject on a finger print scanner having a platen comprising:
  (a) prompting a subject to place one specific pair of fingers from one hand on a platen of a finger printer scanner,
  (b) capturing an image of fingers presented on the platen after said prompting step is carried out;
  (c) determining a difference of at least one characteristic of the fingers in the image; and
  (d) determining whether the difference is consistent with a presentation of the two specific pair of fingers prompted for.

23. The method according to claim 22 wherein said difference in height presents a first difference in height, and said method further comprising the step of: (c) prompting the subject to place a different one of said specific pair of fingers from said one hand on the platen of the finger print scanner;

(f) repeating said step (b) after said step (e) is carried out; (g) determining a difference in height of the fingers in the image captured from step (f) to provide a second difference in height; and (h) determining whether the difference between the first height difference and the second height difference is consistent with a presentation of said one of two pair of specific fingers and said different one of said two pairs of specific fingers when each was prompted for.

24. The method according to claim 23 further comprising the steps of: (i) repeating steps (a) through (g) for a different one of the hand of the subject; (j) determining whether the difference between the first height difference of said one of said hand is approximately the same as the first height difference of said different one of said hand; and (k) determining whether the difference between the second height difference of said one of said hand is approximately the same as the second height difference of said different one of said hand.

25. The method according to claim 24 further comprising the step of: storing fingerprints from said images in an electronic record.

* * * * *